April 2, 1946.        E. B. TIDD        2,397,706
AUTOMATIC VALVE
Original Filed Oct. 31, 1941
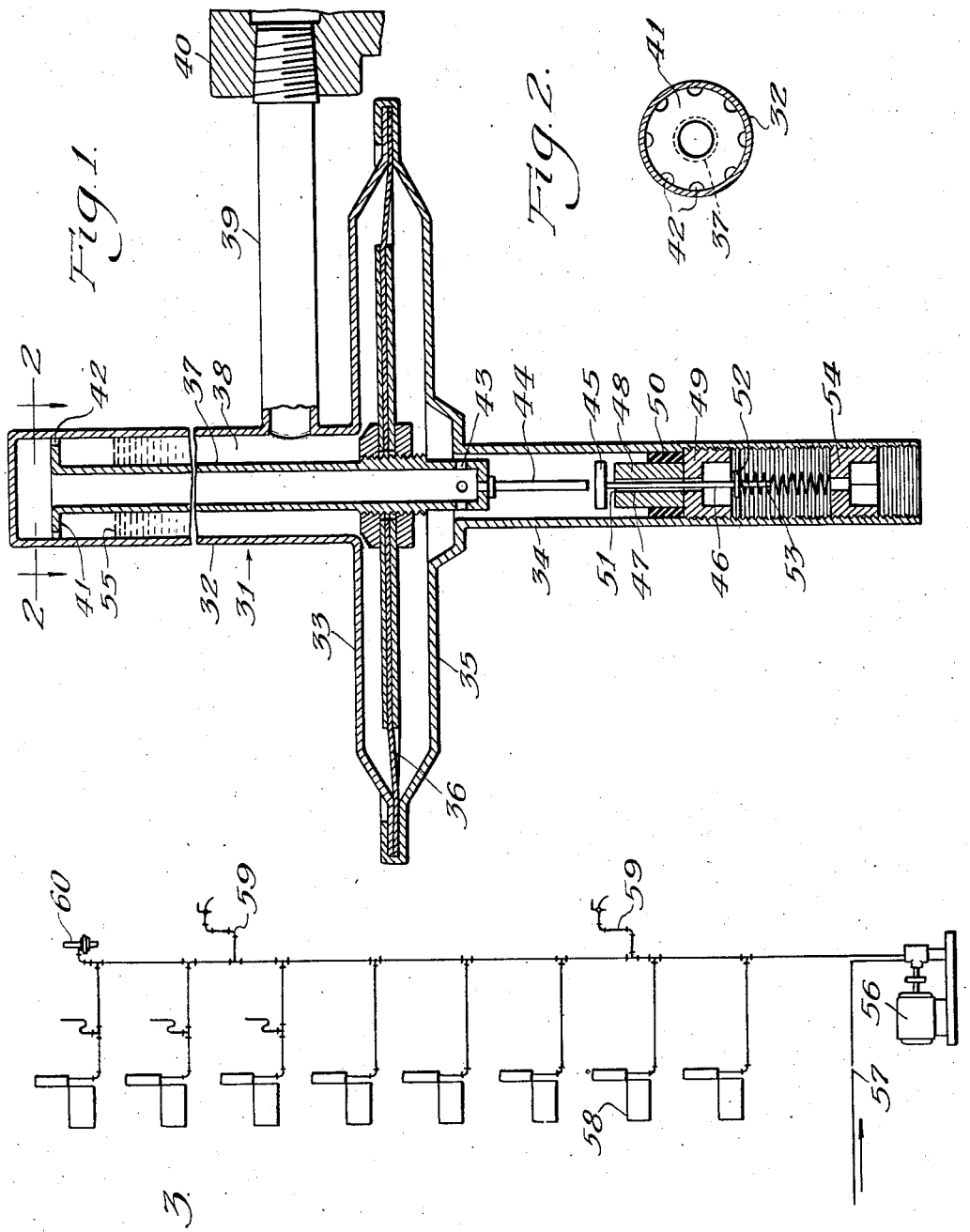
Inventor:
Edwin B. Tidd,
By
Attorney Patented Apr. 2, 1946

2,397,706

UNITED STATES PATENT OFFICE 2,397,706

AUTOMATIC VALVE

Edwin B. Tidd, Mount Prospect, Ill., assignor to Bell & Gossett Company, Chicago, Ill., a corporation of Illinois Original application October 31, 1941, Serial No. 417,327. Divided and this application May 31, 1943, Serial No. 489,119

1 Claim. (Cl. 137—122)

My invention relates to automatic air valves for use with devices which require the discharge or admission of air from or thereto and is primarily concerned with providing a valve which is characterized by a more efficient, sensitive and positive action.

By way of example, my invention will be described as a vent for radiators or any portion of the piping of a hot water heating system from which air must be discharged intermittently. In present types of automatic vents, the usual construction includes a float actuated valve in which the valve is closed by the rise of water in the valve housing acting on the float and opened by gravity action of the float when the water recedes. It has been ascertained that such a valve occasionally sticks to its seat or only partially opens and thus prevents free and adequate venting of the air. This condition is primarily due to the light weight of the float and associated parts which is the only effective force tending to withdraw the valve from its seat, but this force is partially counterbalanced by the boiler pressure acting on the float and valve. The opening action of the vent is accordingly apt to be sluggish or non-positive.

It is therefore the principal object of my invention to devise an air vent which is completely positive in action, embodies a minimum of moving parts, and is characterized by a more powerful action than float operated vents.

A further object is to provide a vent of the character indicated in which the valve is closed by the pressure of a static head of water and mechanically biased to an open position.

A further object is to devise a valve provided with a diaphragm in which the position of the valve depends upon the weight of water imposed on the diaphragm.

These and further objects of my invention will be set forth in the following specification, reference being had to the accompanying drawing, and the novel means by which said objects are effectuated will be more definitely pointed out in the claim.

In the drawing:

Fig. 1 is a sectional elevation of my improved valve.

Fig. 2 is a section along the line 2—2 in Fig. 1.

Fig. 3 is a diagrammatic layout of a water system showing the application of the valve illustrated in Fig. 1 as a means for introducing air into the system to break a condition of partial vacuum.

It will be understood that the invention is not restricted to the discharge from or admission of air to a connected device, but comprehends broadly the venting or admission of a gaseous medium under the control of a weight of liquid applied to a diaphragm which is operatively associated with a valve.

Referring to Figs. 1 and 2, the numeral 31 designates a valve casing which is composed of an upper tubular member 32 whose upper end is closed while the lower end is outwardly flanged as at 33. The lower part of the casing 31 is formed by an open ended, tubular member 34 whose upper end is also outwardly flanged as at 35, the peripheral portions of the flanges 33 and 35 being abutted and clamping therebetween a diaphragm 36. As indicated in the drawing, the innermost portions of the flanges 33 and 35 are offset from their respective peripheries to provide operative clearance for the diaphragm. The diaphragm may be composed of any suitable thin, metallic material and then it is preferably bowed slightly above the horizontal plane. However, the diaphragm may be composed of other materials, such as rubber, natural or synthetic, and in such a case, the diaphragm would normally occupy a horizontal position. Further, the diaphragm is deemed to be the equivalent of any movable wall, including pistons, bellows and the like.

Secured to the diaphragm 36 in coaxial relation to the member 32 is a tube 37 whose outer diameter is less than the internal diameter of the member 32 to thereby define a passage 38 which communicates by way of a hollow, lateral extension 39 with any desired part of a hot water heating system such as a radiator 40. The upper end of the tube 37 is open, terminates short of the upper end of the member 32, and is outwardly flanged as at 41 to provide guiding contact with the member 32 as the diaphragm 36 flexes. Communication between the interior of the tube 37 and the passage 38 is provided by a series of notches 42 cut inwardly around the flange 41. The interior of the tube 37 and member 34 communicate through a series of ports 43 in the tube 37 and the lower end of the latter carries a depending finger 44 whose lower end is operably related to a valve 45 carried by the upper end of a stem 46 that extends loosely through a passage 47 in a sleeve 48 that rests upon a nut 49 threaded internally of the member 34. If desired, a rubber bushing 50 may be disposed between the sleeve 48 and member 34 to provide a leak proof structure at this point. The upper end of the passage 47 constitutes a port 51 which is controlled by the valve 45 and this passage is continued through the nut 49. Beneath the nut 49, a washer 52 is secured to the stem 46 and the upper end of a helical spring 53 abuts against this washer while the lower end bears against a nut 54 also threaded internally of the member 34.

The valve structure just described may be of the type ordinarily employed in pneumatic tires. As the above device is originally made, the valve 45 uncovers the port 51 due to the extending action of the spring 53, the finger 44 being disposed a sufficient distance above the valve 45 to permit the latter being thus raised.

In describing the operation of the valve, it will be assumed that the several portions occupy the positions illustrated in Fig. 1 and that the valve is connected to the radiator 40 forming part of an unfilled, hot water heating system. As water is introduced into the system, air is driven through the extension 39, thence upwardly through the passage 38 and downwardly through the tube 37, ports 43 and member 34 from whence the air is vented through the port 51. Eventually, the water rises in the passage 38 to a point generally indicated by the numeral 55 and at this time the pressure exerted by the head of water in the passage 38 is sufficient to move the diaphragm 36 downwardly and close the valve 45. It will be understood that the height of the member 32 is so related to the size of the diaphragm as to insure the downward flexing of the diaphragm before any water is discharged into the tube 37.

When the system is fired, additional air and gas will be expelled from the water in the system and will collect above the surface of the water in the passage 38, thereby driving the water in the passage downwardly until the head of water in the passage has been decreased sufficiently to permit the diaphragm 36 to flex upwardly towards its original position and at this time the valve 45 will open to vent the accumulated air and gas. This condition occurs intermittently and automatically during operation of the system and requires no manual controlling to effect the venting action.

In Fig. 3 is shown a diagrammatic layout of a water system for a multistory building and illustrates the application of a valve shown in Fig. 1 as a means for introducing air into the system, as distinguished from the venting action already described. In this arrangement, the numeral 56 designates a pump which forces water from a city main 57 upwardly through the system to various sanitary devices 58 and spigots 59 which are intended to generally indicate characteristic parts in a water system of this nature. My improved valve structure is indicated by the numeral 60 and is located at an upper point in the system, the extension 39 (see Fig. 1) providing a connection between the valve structure and the system proper.

In normal operation, the pump in the basement maintains sufficient pressure in the system to insure adequate flow at the upper floors, but in the event of a sudden and extensive draw of water at a lower floor, there is a tendency to reduce the pressure in the upper stories to a point where a partial vacuum is created and this condition may cause water from the sanitary devices to be discharged into the drinking faucets. With my construction, however, it is possible to immediately break this condition, because, referring to Fig. 1, the underside of the valve 45 is always exposed to atmospheric pressure plus the pressure provided by the spring 53. Hence, when a partial vacuum condition occurs in the extension 39, the diaphragm 36 will be immediately moved upward to cause an opening of the valve 45 and an introduction into the system of a quantity of atmospheric air.

For any given operating condition, it will be necessary to properly relate the diaphragm diameter to the height of the member 32 in order to insure that the latter will contain a head of water sufficient to downwardly flex the diaphragm 36. Moreover, these factors must also be properly related to the valve 45 so that the latter may open freely under the condition just described.

This application is a division of my original application, filed October 31, 1941, Serial No. 417,327.

I claim:

An automatic valve structure for controlling the venting of air from a hot water heating system without loss of water from the system comprising a casing having an inlet for connection to the system and a venting aperture, a valve regulating air flow through the aperture, means urging the valve to open position, and a wall movable in the casing above the valve and having means for closing the valve when deflected downwardly, the casing above the wall constituting a chamber communicating with the inlet intermediate the ends of said chamber to receive water therefrom and there being an air venting connection between the chamber at a point adjacent the upper end thereof and the venting aperture, whereby the valve closes when a predetermined head of water rests on the wall less than the height of the venting connection above the wall.

EDWIN B. TIDD.